(No Model.)

H. W. WHELAN.
MATCH BOX MACHINE.

No. 549,412. Patented Nov. 5, 1895.

Fig. 1.

Witnesses:
John Enders Jr.
Henry C. Hazard

Inventor:
Henry W. Whelan
by Prindle & Russell
his attorneys.

(No Model.) 8 Sheets—Sheet 4.

H. W. WHELAN.
MATCH BOX MACHINE.

No. 549,412. Patented Nov. 5, 1895.

Fig. 4.

Witnesses:
John Enders, jr.
Henry C. Hazard

Inventor:
Henry W. Whelan
by Prindle & Russell
his Attorneys (No Model.) 8 Sheets—Sheet 5.

H. W. WHELAN.
MATCH BOX MACHINE.

No. 549,412. Patented Nov. 5, 1895.

Fig. 5.

Witnesses:
John Enders, Jr.
Henry C. Hazard.

Inventor:
Henry W. Whelan
by Prindle and Russell
his Attorneys (No Model.) 8 Sheets—Sheet 6.

H. W. WHELAN.
MATCH BOX MACHINE.

No. 549,412. Patented Nov. 5, 1895.

Witnesses:
John Enders Jr.
Henry C. Hazard

Inventor:
Henry W. Whelan

(No Model.)   8 Sheets—Sheet 7.

H. W. WHELAN.
MATCH BOX MACHINE.

No. 549,412.   Patented Nov. 5, 1895.

Witnesses:
John Enders Jr.
Henry C. Hazard.

Inventor:
Henry W. Whelan
by Prindle and Russell
his Attorneys (No Model.) H. W. WHELAN. 8 Sheets—Sheet 8.
MATCH BOX MACHINE.

No. 549,412. Patented Nov. 5, 1895.

Witnesses:
John Onders Jr.
Henry C. Hazard.

Inventor:
Henry W. Whelan
by Prindle and Russell
his Attorneys

UNITED STATES PATENT OFFICE.

HENRY W. WHELAN, OF DETROIT, MICHIGAN, ASSIGNOR TO THE DIAMOND MATCH COMPANY, OF CHICAGO, ILLINOIS.

MATCH-BOX MACHINE.

SPECIFICATION forming part of Letters Patent No. 549,412, dated November 5, 1895.

Application filed March 31, 1893. Serial No. 468,621. (No model.)

*To all whom it may concern:*

Be it known that I, HENRY W. WHELAN, a citizen of the United States, residing at Detroit, in the county of Wayne, State of Michigan, have invented certain new and useful Improvements in Match-Box Machines; and I do declare the following to be a full, clear, and exact description of the invention, such as will enable others skilled in the art to which it appertains to make and use the same, reference being had to the accompanying drawings, in which—

Letters of like name and kind refer to like parts in each of the figures.

The object of my invention has been to provide an improved machine for making boxes for matches and the like; and to this end my invention consists in the machine and in the construction, arrangement, and combination of the parts thereof, as hereinafter specified.

As will be seen from the description to be hereinafter given and from the drawings, my present invention relates to that class of machines in which the boxes are made from a strip of flexible material, preferably pasteboard, such strip being automatically glued, cut, scored, and separated into blanks, and the latter being folded up into complete boxes.

In the drawings, A designates the bed-plate or table for the support of the various operative parts of the machine, such plate being itself supported in any desired way, as by the uprights $A'\ A'$, to be secured to any suitable floor or foundation. Below such bed-plate or table is the roll B of the strip of material to be used, supported on a shaft $b$, journaled in open bearings on the standards $B'\ B'$, so that a new roll can be easily and quickly put in place when any roll has been used up.

Figure 1:
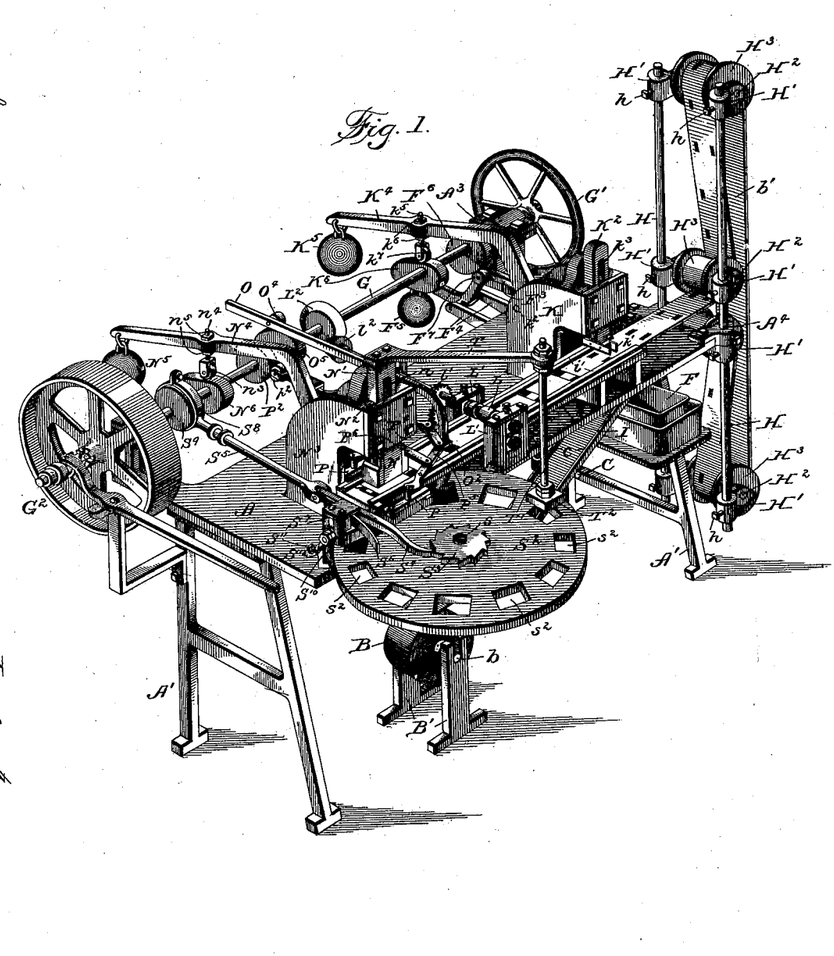
Figure 1 shows a perspective view of my machine.
Figure 2:
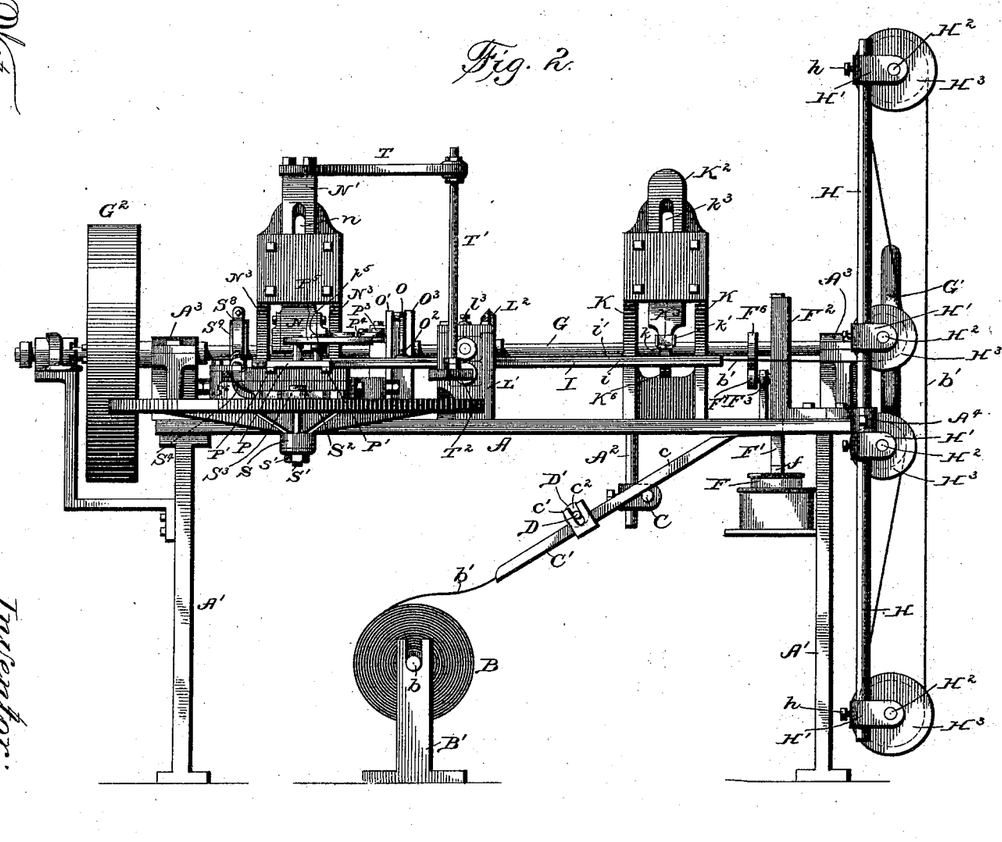
Fig. 2, a view of the same in front elevation.
Figure 3:
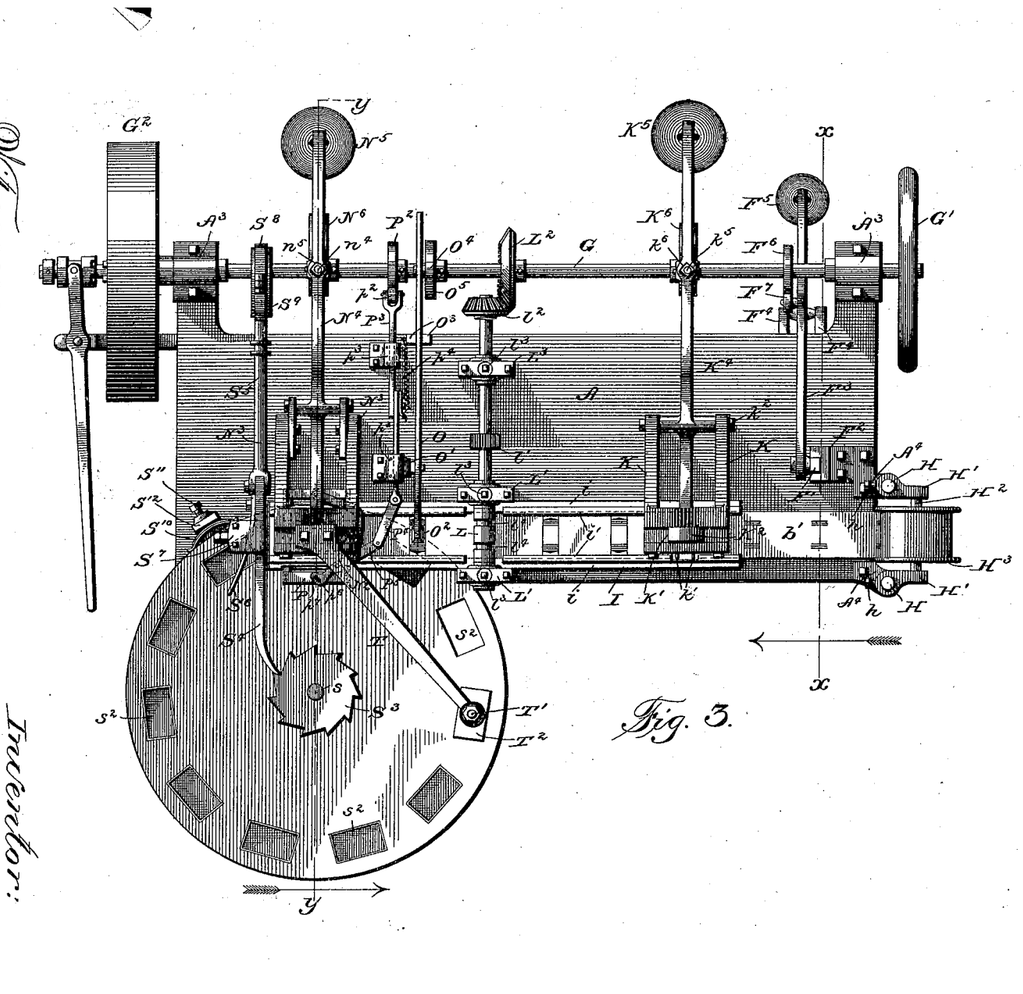
Fig. 3, a plan view of the same.
Figure 4:
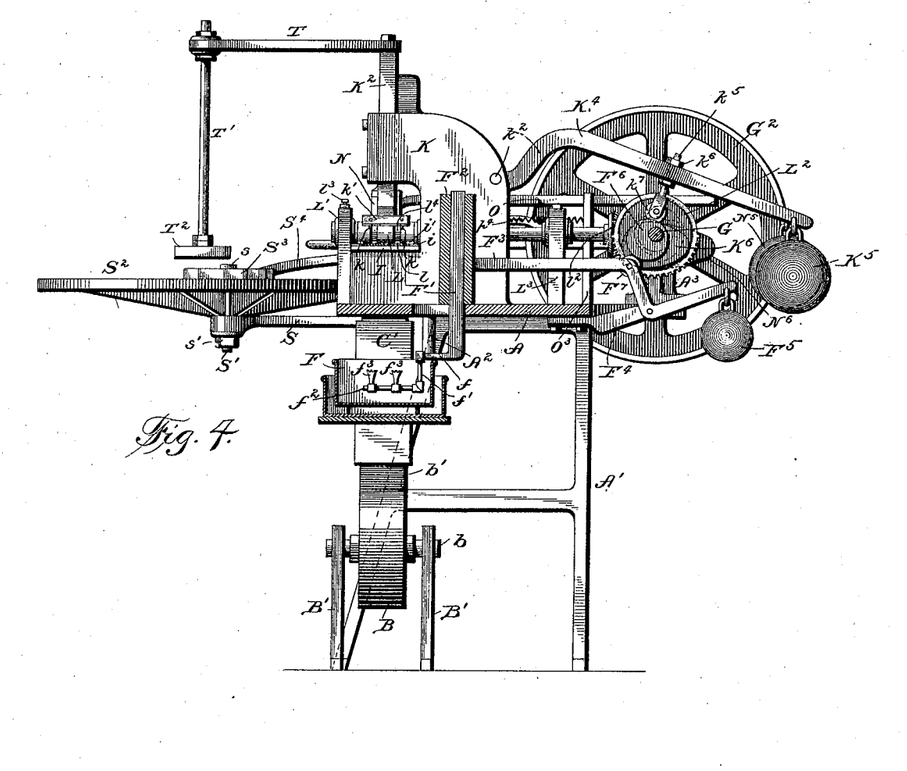
Fig. 4, a view of a vertical section of the machine on line $x\ x$ of Fig. 3.
Figure 5:
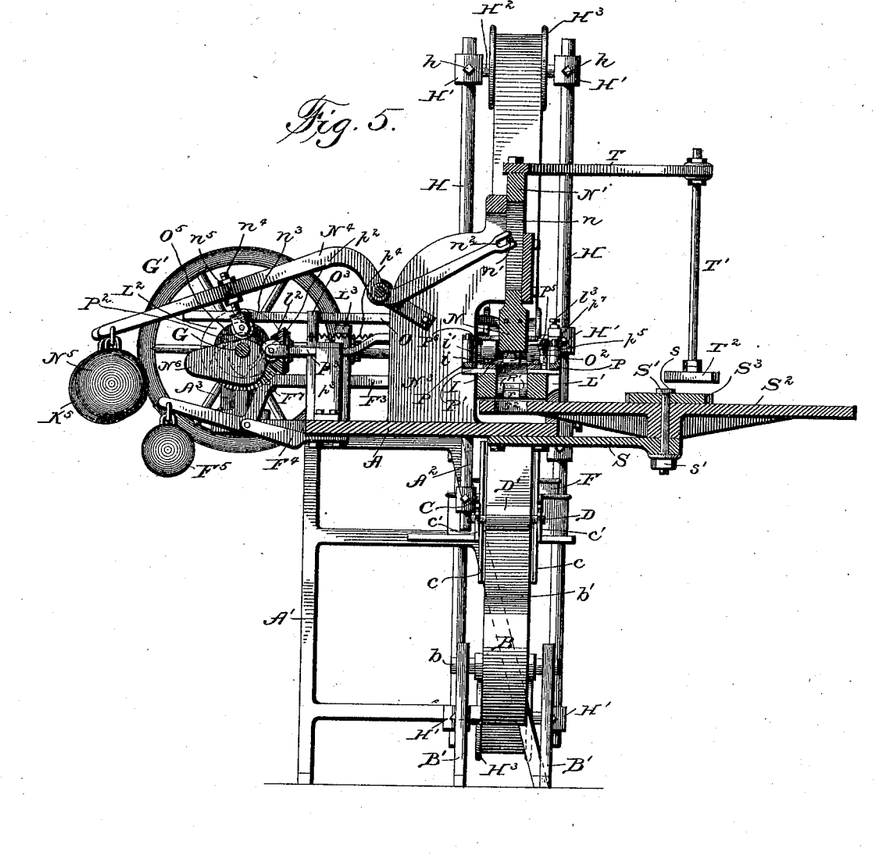
Fig. 5, a view of a similar section on line $y\ y$ of Fig. 3, but looking from the end of the machine opposite to that from which the view in Fig. 4 is taken.
Figure 6:
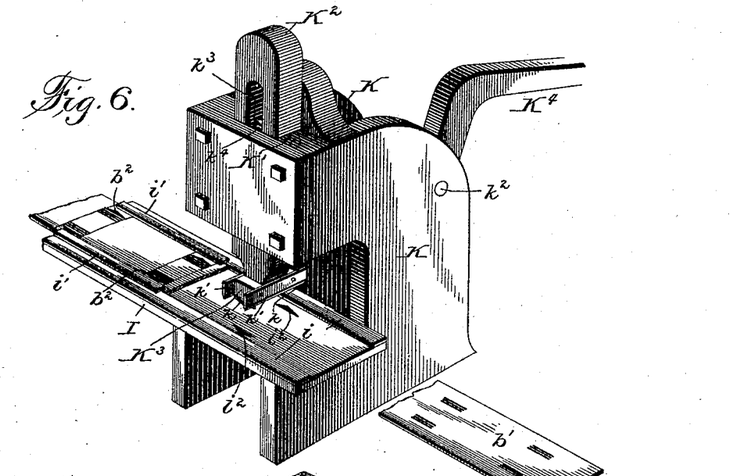
Fig. 6, a detail perspective view of the mechanism for cutting out the excess portions of the strip which occupy the spaces to be left between the end flaps and the projecting portions of the side flaps in the blank as prepared for folding into a box.
Figure 11:
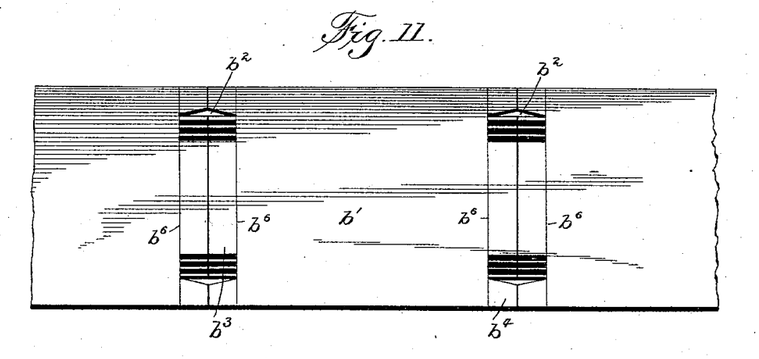
Fig. 11, a detail plan view, on an enlarged scale, of a portion of the strip of pasteboard as it appears after passing the gluing, cutting, and scoring devices and the feed-rolls with their cutter for partially severing the blanks.
Figure 12:
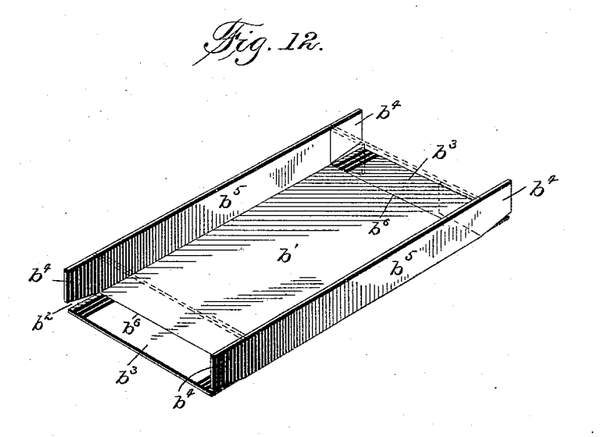
Fig. 12, a detail perspective view, on an enlarged scale, showing in full lines the blank with its side flaps folded up, as they are during the first movement of the former down into the die-opening in the platform, and in dotted lines such blank as folded up into a complete box.

Attached to the table A is the pendent arm $A^2$, upon which is clamped the piece C, carrying the inclined strip-guiding plate $C'$, having the ribs $c\ c$, between which the strip $b'$ passes on its way over the plate from the roll B. On opposite sides of this plate are the lugs $c'\ c'$, having the open-ended slots $c^2\ c^2$, forming bearings for the shaft D of the roller $D'$, so that such roller, while being held in proper position extending across over the plate, is free to rise and fall and rests with its weight bearing upon the strip passing up over the inclined guide-plate. Just beyond the upper end of this plate, which stands close to the under side of bed-plate A, is the gluing device for applying the required amount of glue to the strip $b'$ as the latter is moved along from plate $C'$ by the devices to be hereinafter described. Such gluing device consists of a glue-containing vat or tank F, which can be provided with any of the well-known means for keeping the glue hot and liquid—as, for instance, the hot-water jacket shown—and a rising and falling bar $F'$, guided in a vertical way in the upright $F^2$ on the bed-plate A and having a horizontally-extending arm $f$ on its lower end, which carries a pendent rod $f'$, attached at its lower end to a horizontal rod $f^2$, which bears the glue-applying shoes $f^3 f^3$, whose upper horizontal faces are corrugated or provided with ribs running longitudinally with reference to the strip passing above the shoes. Of these shoes there are two, so situated as to stand below the points near the opposite edges of the strip where the glue is to be applied to the strip portions which are to form the box-end-making parts or flaps of the separate blanks subsequently made from the strip, as indicated in Figs. 3, 11, and 12.

While the upper glue receiving and applying faces might be made flat or plane, I prefer the ribbed or corrugated form, which will apply the glue in narrow parallel lines, and by so doing insure uniform distribution and application of the glue.

The shoe-carrying rod $f^2$ is so arranged that as the bar $F'$ descends to the limit of its downward travel it and the shoe will be submerged in the glue in the vat F. Connected with the bar $F'$, so as to actuate the same, is the forward end of lever $F^3$, which is pivoted upon bracket-arms $F^4 F^4$ on the table or bed-plate A. The rear end of this lever is provided with a weight $F^5$, which serves by depressing such end to raise the forward end of the lever, and so cause the bar $F'$ to rise and lift the glue-applying shoes $f^3 f^3$ from the glue-vat into contact with the strip $b'$. With this construction it will be observed that the glue is applied with a yielding pressure, which, being dependent only upon the weight $F^5$, will always be uniform, so that the portions of glue left on the strip will always be the same as to amount and applied in exactly the same way.

Journaled in suitable bearings $A^3 A^3$ on the rear side of the bed-plate or table A is the driving-shaft G for actuating the different moving parts of the machine, which, as shown, carries on one end the fly-wheel $G'$ and on the other the band pulley or wheel $G^2$ for the application of driving power from any suitable motor or driver, but can be provided with any desired kind of power receiving and transmitting gearing instead of such band pulley or wheel. Fixed upon and rotating with such shaft is the cam-wheel $F^6$, engaging the anti-friction-roller $F^7$ on the lever $F^3$ and shaped so as to force the forward end of the lever and the bar $F'$ connected therewith down against the stress of weight $F^5$ until the shoes $f^3 f^3$ are submerged in the glue in vat F, to hold the lever as so moved, and then to allow it to move quickly under the stress of the weight, so as to raise the shoes from the glue against strip $b'$.

Supported in bracket-arms $A^4 A^4$ on the table A are the two upright parallel rods H H, upon which are adjustably fixed the bearing-pieces $H' H' H' H'$, in which the ends of the shafts $H^2 H^2 H^2 H^2$ of the rollers $H^3 H^3 H^3 H^3$ are journaled. As shown, each of these pieces has a tubular portion encircling the respective rod H and a set-screw $h$ to engage the latter and hold the piece securely in place. Of these rollers two are situated close together, one of which has its upper side arranged to support the strip $b'$ just beyond the gluing device above described, while the other is situated at a short distance above this roller, so as to have its under side substantially on a line with the horizontal platform I, which is supported above the bed-plate or table A and extends longitudinally over the latter. The other rollers are supported from the rods H H at points respectively above and below the pair of rollers just described and at some distance therefrom. The strip $b'$, after passing the glue-applying devices, is carried onward over the nearest roller and thence downward under the lowest one, upward over the top roller, and then under the higher of the two inner rollers to the platform I. This arrangement is to give the glue time to partially set and get into its most readily and strongly adhesive condition before the folding devices, to be described hereinafter, are reached. The distance through which the strip will pass before leaving the rollers $H^3 H^3$ can readily be made longer or shorter, to give the glue a longer or shorter exposure to the atmosphere, by adjusting the bearing-pieces $H' H'$, which support the outermost rollers, from or toward those bearing the two inner ones.

The platform I is provided with the longitudinal guide-strips $i\ i$ and $i'\ i'$, the former arranged to engage the edges of the pasteboard strip $b'$ and the latter to overlap the sides of such strip enough to hold it down in place as it is passed along over the platform. The end of such platform nearest the rollers $H^3 H^3$ is supported above the bed-plate A upon projecting portions of the upright parallel plates K, which are attached to the bed-plate. Both this part and the rest of the platform can be supported in any other desired way at the desired distance above the bed-plate without involving any departure from my invention.

Guided in a vertical way $K'$ on the plates K K is the reciprocating plunger $K^2$, carrying on its lower end the head $K^3$, provided with the cutters $k\ k$, adapted to cut from the strip $b'$ the excess portions $b^2 b^2$ which are between the parts of the strip which are to form the box-end-making flaps $b^3 b^3$ of the completed blank and those parts which are to form the projecting ends $b^4 b^4$ of the side flaps $b^5 b^5$ of such blank. To facilitate the cutting and removal of these excess portions, the platform I is provided with the openings $i^2 i^2$, to register with cutters $k\ k$. On the opposite sides of head $K^3$ not occupied by cutters $k\ k$ are the scoring-blades $k' k'$, adapted to score but not cut through the strip on transverse lines $b^6 b^6$, upon which the end flaps $b^3 b^3$ of the blank are to be folded or bent up in forming the box. While this plunger $K^2$ can be actuated in any desired way to cause the strip $b'$ to be cut and scored, while on platform I, in the manner described, I prefer the mechanism shown, consisting of the lever $K^4$, pivotally supported from plates K K at $k^2$, having its forward end extending into slot $k^3$ in the plunger, forked to engage the pin $k^4$, carried by the latter, and its rear end provided with the weight $K^5$, adapted to swing the lever to raise the plunger with its cutter-carrying head $K^3$. A rod $k^5$, having its upper portion threaded and secured to the rear arm of this lever by nuts $k^6$ $k^6$, has journaled upon it a roller $k^7$, which engages the cam-wheel $K^6$, fixed on the rotary driving-shaft G, such cam-wheel being formed to raise the rear arm of the lever so, as to force down the plunger $K^2$, to cause the cutters and scoring-blades to act upon the strip $b'$, and then leave the lever free to be swung by weight $K^5$ to raise the plunger again. The cams $K^6$ and $F^6$ are so timed, relatively, that they positively move their respective levers alternately or at different times. The position of the head $K^3$ with relation to the upper face of platform I as the plunger is forced down by the action of the cam-wheel $K^6$ can be adjusted, as desired, by raising or lowering the rod $k^5$ with reference to the arm of the lever carrying it.

Beyond the cutting and scoring mechanism described the strip $b'$ passes between the two feed-rollers L L, of which the upper one carries the longitudinal blade $l$, adapted to partially sever the strip, so that it can be easily separated afterward on the lines upon which such blade acts. The two rollers being journaled in suitable bearings carried by the posts $L'$ $L'$ on the bed-plate A, have their shafts geared together by gears $l'$ $l'$, so that they must rotate in unison. The shaft of the upper roller extends out over the rear side of the bed-plate A, and carries on its rear end the bevel-wheel $L^2$ on the driving-shaft G. This wheel $L^2$ is a segmental gear having gear-teeth to mesh with and drive the pinion $l^2$, extending only around part of it. There are just enough of these teeth to cause one full revolution of the pinion $l^2$, and the shaft of the upper roller, upon which such pinion is fixed, and the teeth are so situated that they mesh with and complete the revolution of the pinion before the plunger $K^2$ is forced down to bring the cutters on its head $K^3$ into contact with the strip $b'$, and do not again reach the pinion until the plunger and head are raised to disengage the strip. The diameter of the gear-wheel $L^2$ is twice that of pinion $l^2$; but the gear-teeth extend only half-way around it, so that during half a revolution of the shaft G the feed-rollers are stationary. The circumference of the upper feed-roller L is equal to the length of one of the box-blanks to be formed from the strip and folded up into the completed box, and the blade $l$ is so situated that it will at each full revolution of the roller engage the strip $b'$ on a line midway between the lines upon which the scoring-blades $k'$ $k'$ on head $K^3$ have previously scored it. With said feed-roller of the circumference described, each revolution will feed the strip $b'$ along on its supporting-platform I the length of one of the box-blanks.

The journal-boxes in which the shaft of the upper feed-roller is journaled are made movable up and down on posts $L'$ $L'$ and are held down in position by set-screws $l^3$ $l^3$, by which the distance to which the roller can move away from the roller below it can be regulated to suit any thickness of strip $b'$. The roller-shaft which carries the pinion $l^2$ is near its rear end supported in a similarly-adjustable bearing on the post $L^3$ on the bed-plate A. The upper feed-roller has its periphery formed with circumferential depressions or grooves $l^4$ $l^4$ to permit the passage of the glued portions of the upper face of the strip $b'$ without contact with the roller.

At some distance beyond the described feed-rollers is the rectangular die-opening M, through which the box-blank is forced by the reciprocating former N during the folding operation, to be described. As shown, this opening, which is just large enough to allow the downward passage of one of the completed boxes made from a blank folded upon the former, has its sides $m$ $m$, which come below the side flaps $b^5$ $b^5$ of the box-blank on the end of strip $b'$, made higher than the other sides $m'$ $m'$, so that as the rectangular former N engages the body or box-bottom forming part of the blank and presses it down into the opening the said side flaps will be turned up against the sides of the former first, and the end flaps $b^3$ $b^3$ will not be turned up until the former has traveled some distance between the higher sides of the die-opening M. The end flaps will then be engaged by the edges of the lower sides of the opening and bent upward and inward toward the plunger into the upright positions which they are to occupy in the completed box.

The former N is carried on a plunger $N'$, reciprocating vertically over the die-opening M in a suitable way in the head $N^2$ on the upright plates $N^3$ $N^3$, supported on bed-plate A, and is provided with a longitudinal slot $n$ and a pin $n'$, extending across the latter. A lever $N^4$, pivotally supported on plates $N^3$ $N^3$, has its forward end projecting into slot $n$, forked at $n^2$, so as to engage pin $n'$, and its rear end projecting out over and beyond shaft G, provided with weight $N^5$, acting to swing the lever to raise the former-carrying plunger $N'$. A cam $N^6$ on shaft G engages the roller $n^3$, journaled on the rod $n^4$, carried by the lever, and is so shaped as to force the rear arm of the lever up to carry the former down through the die-opening M while the feed-rollers L L are stationary and to allow the weight $N^5$ to return the lever and raise the former above platform I before such rollers begin to rotate again to feed the strip $b'$ along to bring a new blank over the die-opening. To enable the throw of the former with reference to platform I to be adjusted, the rod $n^4$, carrying the cam-engaging roller $n^3$, is threaded and provided with nuts $n^5$ $n^5$, engaging, respectively, the upper and lower sides of the lever. As the former N descends to force the box-blank below it down through the die-opening M it tears the blank from the strip $b'$ on the line where the blade $l$ has nearly cut through the strip, such line being midway between the two scored lines on adjoining blanks. In order that the strip may be held from longitudinal movement as the end blank is thus torn off or separated from it, I provide a clamping device to engage and hold the blank next to the end one. Such device, as shown, consists of a lever O, pivotally supported on a standard $O'$ on bed-plate A and bearing on its forward end a foot $O^2$, with its under face arranged to engage a portion of that blank next to the one brought over opening M and below former N. The rear arm of this lever, extending rearward between the upright guides $O^3$ $O^3$ on the bed-plate A and beyond shaft G, has its rear end provided with a roller $O^4$, engaging the cam $O^5$ on such shaft. This cam is adjusted so as to actuate the lever to bring the foot $O^2$ down upon a portion of the next to the end blank on the strip $b'$ just before the former N begins to force the end blank down into the die-opening M, and then to cause such foot to firmly clamp the part of the blank which it engages down against the platform and prevent it from being shifted or pulled along as the former separates the end blank from the strip on the partially-cut-through division-line made by the blade $l$ on the upper feed-roller L.

Figure 7:
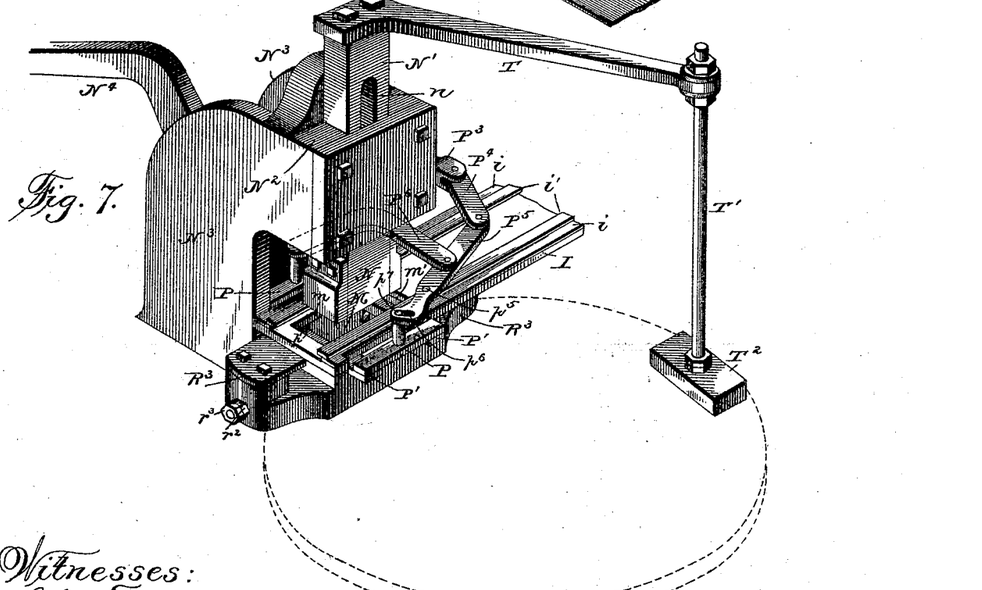
Fig. 7, a similar view of the blank-folding mechanism.
Figures 8, 9:
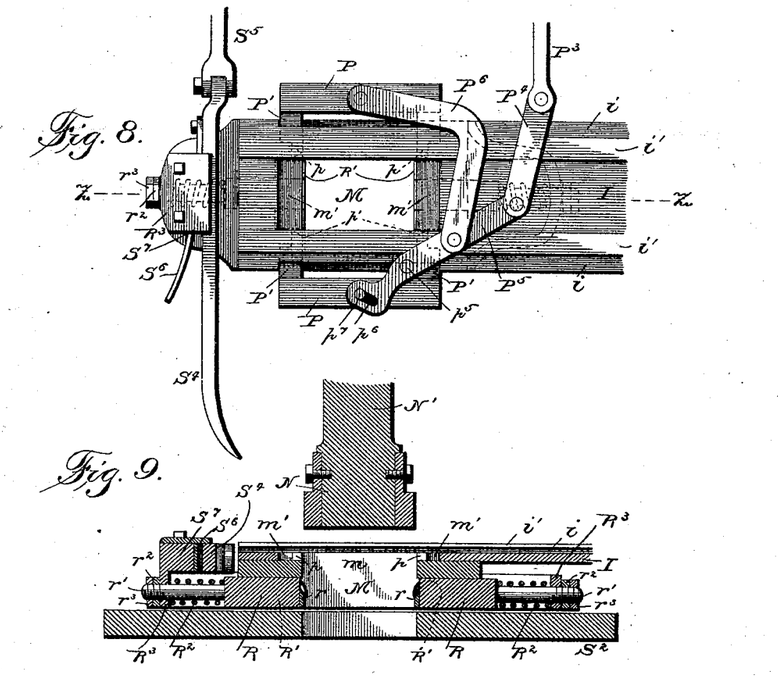
Fig. 8, a detail plan view, on an enlarged scale, showing the blank-folding mechanism with the former upon which the blank is to be folded removed.
Fig. 9, a view of a section on line $z\ z$ of Fig. 8.
Figure 10:
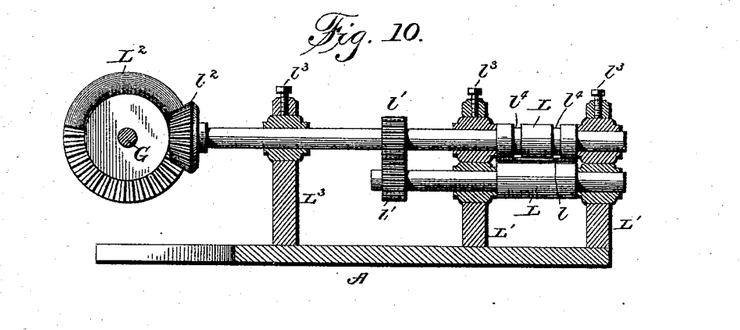
Fig. 10, a detail view, partly in section and partly in elevation, showing the feeding-rolls.

On opposite sides of the opening M are the horizontally-reciprocating bars P P, each carrying a pair of inwardly-projecting arms $P'$ $P'$, guided in suitable ways on the platform I and carrying on their inner ends the fingers $p$ $p$, which are situated and arranged so that as the bars P P are moved inward toward the middle line of the die-opening they will pass close to the path of those faces of the former N which stand above the end flaps of the blank and toward which the end flaps are bent inward by the lower sides of the die-opening in the manner described hereinbefore. (See Figs. 7, 8, and 9.) On their inner ends these fingers are inclined or rounded off, as shown at $p'$ $p'$, so that as the bars P P are forced inward after the former N has carried a blank down into the die-opening, so as to fold the side flaps $b^5$ $b^5$ of the blank up against its sides, such fingers will engage the projecting ends $b^4$ $b^4$ of such flaps and turn them inward, so as to overlap the faces of the former which are above the end flaps $b^3$ $b^3$ of the blank. The subsequent folding up of the end flaps by the continued movement of the former down past the lower sides of the die-opening M will then bring the glued portions of such flaps against the inturned portions $b^4$ $b^4$ in the position shown in dotted lines in Fig. 12. To actuate the bars P P to move the arms $P'$ $P'$ and fingers $p$ $p$ inward at the proper time to secure this described inturning of parts $b^4$ $b^4$ of the blanks—that is, just after the side flaps have been folded up and before the end flaps have—I provide the shaft G with a cam $P^2$, which engages a roller $p^2$ on the reciprocating bar $P^3$, guided in suitable guides $p^3$ $p^3$ on bed-plate A. A spring $p^4$, attached to this bar, and a stationary support on the bed-plate serve to retract this bar after it has been moved forward by the cam. Pivotally connected with the forward end of this bar is a link $P^4$, which has its other end pivoted to the horizontally-swinging lever $P^5$, pivoted upon a suitable pivot-pin $p^5$ on the platform I or the guide-strip $i'$, supported therefrom. The forward or outer arm of this lever is provided with the inclined slot $p^6$, engaging a pin $p^7$ on the front one of bars P P, so that as the lever is swung by the movement of the bar $P^3$, as the latter is actuated by cam $P^2$, the bar, with its arms and folding-fingers, will be moved inward toward a middle line through opening M. In order that the other bar P, with its arms and fingers, may be simultaneously moved inward in the opposite direction, I connect it with the rear arm of lever $P^5$ by means of the link $P^6$, pivoted at opposite ends to the lever and bar, respectively, and bent, as shown, to clear the path of former N.

With the actuating-cams $P^2$ and $N^6$ on the same shaft G, the movements of the former and the bars P P by the mechanism described can be easily and certainly timed, relatively, so that the fingers $p$ $p$ will be caused to engage and turn in the projecting ends $b^4$ $b^4$ of the side flaps $b^5$ $b^5$ after the latter have been folded up and before the end flaps $b^3$ $b^3$ of the blank are folded. After the bars P P have been moved inward by the action of cam $P^2$ through the slotted-lever-and-link mechanism described they are quickly retracted by the spring $p^4$, which by actuating the reciprocating bar $P^3$ swings the lever $P^5$ to cause the link $P^6$ to force one bar P outward, while the inclined slot on the forward end of the lever, engaging the pin on the other bar P, causes the latter to move outward from opening M also.

Guided in suitable ways supported from platform I are the reciprocating heads R R, which, being situated on those sides of opening M which are to engage the end flaps of the box-blank, are made movable in a direction at right angles to the travel of bars P P above described. Each of these heads has journaled on opposite sides of its inner ends the two rollers $R'$ $R'$, in position to engage those portions of the folded-up end flaps of the box-blank which have been glued and are overlapped by the inturned parts $b^4$ $b^4$ of the side flaps. Between these rollers each head has a projecting portion $r$, which has an abrupt under side adapted to project in over and engage the upper edge of a box folded upon the former when such box has been carried by the former down below this projecting portion and the head R has been moved in toward the former. On its upper side such projecting portion is beveled off on an upward and outward incline. To force the heads R R inward toward the path of the plunger to cause the rollers to press the glued portions of the box ends against the overlapping parts $b^4$ $b^4$ of the flaps forming the box sides and to bring the box-edge-engaging portions $r$ $r$ over a finished box to hold the latter down and strip it from the former N when such former rises after a full downward stroke through the die-opening M, I provide such heads with springs $R^2$ $R^2$, surrounding the stems $r'$ $r'$ on the heads and bearing at their inner and outer ends, respectively, against abutting faces on the heads and on the plates $R^3$ $R^3$, supported from platform I. Each stem passes through an opening in the respective plate and has a threaded portion carrying a nut $r^2$ to engage the outer side of the plate, and so limit the inward movement of the head R under stress of the respective spring $R^2$, and a lock-nut $r^3$ to lock the other nut from accidental turning when adjusted to properly adjust the extreme inward position to be taken by the head or the extent to which the rollers on the heads will project in beyond the sides of the opening M in the path of the box ends folded up on the former.

Attached to and extending forward from bed-plate A is the arm S, carrying on its forward end the upright pivot-pin S', upon which is journaled the horizontal rotating disk $S^2$, having attached to its upper side, so as to rotate with it, the ratchet-wheel $S^3$. The pivot-pin S' is, preferably, as shown, in the shape of a bolt, having on its upper end a head $s$, engaging the upper side of ratchet-wheel $S^3$, and on its lower end the threaded part provided with a nut $s'$ below the under side of the arm S. The disk $S^2$ being situated so that its upper face revolves close to the under side of the opening M and just below the roller-carrying heads R R, provided, as described, with means for engaging and stripping the completed boxes from the former N, is provided with a series of rectangular apertures $s^2$ $s^2$, each of such size and shape as to receive and hold closely a completed box brought down through the die-opening M by the former. These box receiving and holding apertures are so arranged that they will, as the disk revolves, be brought successively below the die-opening M, and, when so brought, will have their interior walls in line with the corresponding inner faces of the die-opening M. As shown, the disk $S^2$ has eleven of the apertures $s^2$ $s^2$; but their number can be made more or less, as desired, without departure from my invention. The ratchet-wheel $S^3$ has its teeth equal in number to the disk-apertures, and engaging such wheel is the pawl $S^4$, carried on the forward end of the reciprocating rod $S^5$ and held pressed against the ratchet-wheel by a spring $S^6$. This pawl passes through a guide $S^7$ on one of the plates $R^3$ hereinbefore described, and the spring, being attached at one end to the pawl, has its free portion engaging a bearing-face on such guide. The rod $S^5$ is at its rear end provided with an eccentric-strap $S^8$, engaging the eccentric $S^9$ on shaft G, so timed as to reciprocate the rod to cause the pawl $S^4$ to turn the ratchet-wheel through the space of one tooth before each downward movement of the former N to carry a folded box down through and beyond the die-opening M in the manner described hereinbefore.

The ratchet-teeth are so arranged with reference to the box receiving and holding disk-apertures that each movement of the ratchet-wheel by the forward travel of pawl $S^4$ will bring one of such apertures into proper position directly under the die-opening. To hold the disk as turned and keep it from accidental turning during the rearward travel of the pawl $S^4$, I provide a brake-spring $S^{10}$, engaging the periphery of the disk, and being held against the same by the set-screw $S^{11}$, tapped through bracket $S^{12}$, supported from bed-plate A.

With the construction described and shown each time that the former N descends to fold a blank up into a box and carry such box down past the die-opening the box will be received and closely held to prevent unfolding by one of the disk-apertures $s^2$ $s^2$, and will by the engaging projections $r$ $r$ on the heads R R projecting over the box edges be held down in the disk-aperture when the former N rises again. As the disk revolves to receive successively more boxes in its apertures the glue on a box held in one of the latter will be given time to harden, so as to be able to hold the sides and ends of the box from separating. Attached to the reciprocating plunger N', carrying the former N, is an arm T, which carries on its forward end a pendent rod T', provided on its lower end with a foot $T^2$, adapted as the former descends to carry a formed box into one of the apertures $s^2$ $s^2$ of the disk to engage and push a box from one of the apertures previously filled. The position of foot $T^2$ is such that it will at each downward movement of plunger N' pass down through a disk-aperture which is near the point where said aperture would come again under the die-opening as the disk revolves. The object is to have this discharging device situated so as to allow as much time as possible for the glue to set or harden on any box held in the disk. With this end in view such device could be placed even nearer the point where the disk-apertures pass again into the path of the former, or the disk could be increased in diameter and be provided with a greater number of openings, requiring a greater time for the passage of any one aperture from the point where it receives a folded box around to the place where the discharging device acts to eject the box.

The operation of my machine, which will be understood from the foregoing description and the drawings, is briefly as follows: The strip of pasteboard, passing from the supply-roll up over the guide-plate and around the rollers H³ H³ to and over platform I, is fed along on the latter by the intermittingly-rotating feed-rollers, which at each revolution feed the strip along a distance equal to the length of one of the box-blanks to be formed from it. While the strip is unmoved, because of the stopping of the feed-rollers during a half-revolution of the driving-shaft G, the glue-applying device is actuated by its weight to bring the ribbed or corrugated shoes from the glue in the vat to and against the strip. During the stoppage of the strip the excess portions between the parts of the strip which are to form the end flaps of the blanks and the projecting ends of the side flaps are cut and the strip is scored transversely on two parallel lines on opposite sides of these cuts. While the strip remains at rest the next to the last or end blank on the strip is engaged and held down upon the platform to prevent its movement toward the die-opening and the former descends, so as to carry the end blank down through the die-opening in platform I. The downward forcing of this blank separates it from the one held by the described clamping device on the line upon which the cutter on the upper feed-roller has partially cut through the strip. As the blank is carried down through the die-opening the higher sides of the latter first turn up the side flaps of the blank. The fingers $p$ $p$ turn in the projecting ends of said side flaps, and the lower sides of the opening then cause the end flaps to be folded up to bring their glued portions against such inturned ends of the side flaps. As the blank thus folded up into a box on the former is carried on down through the die-opening the rollers on the spring-pressed heads R R roll the ends of the box closely against the inturned ends of the side flaps, so as to glue the overlapping portions firmly together. As the box is carried below the heads R R into the receiving and holding aperture of the disk S² the heads spring inward to bring their projecting portions, which are between the rollers, over the edge of the box to strip it from the former N as the latter rises again. As the former descends to place a completed box in one of the disk-apertures the ejecting or discharging device connected with the former-carrying plunger ejects one of the previously-formed boxes from one of the other disk-apertures. After the former has been raised from the carrier-disk the latter is turned forward by the pawl mechanism to bring the aperture next to the rear of the one filled under the die-opening M. After the former, the strip-clamping device, and the head carrying the cutters and scoring-blades have been lifted from the strip $b'$ the feed-rollers are by the segmental gearing rotated again through one full revolution to advance the strip to bring a new blank thereon in place over the die-opening and under the former N and the blade on the upper feed-roller partially severs the blank-forming part of the strip which has just been moved forward by the rollers on the transverse line of division between that and the succeeding blank-forming part.

The operation above described will go on continuously and rapidly to form complete and perfect boxes as long as the supply of pasteboard strip is kept up and the glue-vat is supplied with glue for the glue-applying shoes.

Having thus described my invention, what I claim is—

1. In a box-machine, in combination with the former upon which the blank is folded, the spring-pressed heads down between which the former passes, carrying bearing surfaces to press upon the folded blank, and having shoulders to engage the upper edge of the folded blank, after it has been carried below such shoulders by the former, substantially as and for the purpose specified.

2. In a box-machine, in combination with the former upon which the blank is folded, the heads, between which the former passes with the folded blank, having the rollers, and the shoulders to engage the upper edge of the blank, when it has been carried below the heads by the former, and the springs forcing the heads inward toward the former, substantially as and for the purpose shown.

3. In a box-machine, in combination with the former upon which the blank is folded, the heads between which the former carries the folded blank, carrying bearing surfaces to engage such blank, as it passes them, springs forcing such heads inward toward the former, and adjustable means for limiting the movement of the heads under the stress of their springs, substantially as and for the purpose set forth.

4. In a box-machine, in combination with means for gluing the blank to be used, the former, and means for folding the blank upon the same with portions of the side forming parts of the blank turned in past parts of the box end forming parts, spring pressed heads, between which the former passes, having bearing surfaces to engage and press upon the parts of the box ends which overlap the inturned portions of the blank, and provided with shoulders to project over the upper edges of the folded blank after the former has carried such blank down below them, substantially as and for the purpose described.

In testimony whereof I affix my signature in presence of two witnesses.

HENRY W. WHELAN.

Witnesses:
EDWARD H. PARKER,
E. S. WHEELER.